Oct. 1, 1957 F. PERLIN 2,807,990
FLASH SYNCHRONIZING FOR STEREOCAMERA
Original Filed Nov. 1, 1952 4 Sheets-Sheet 1
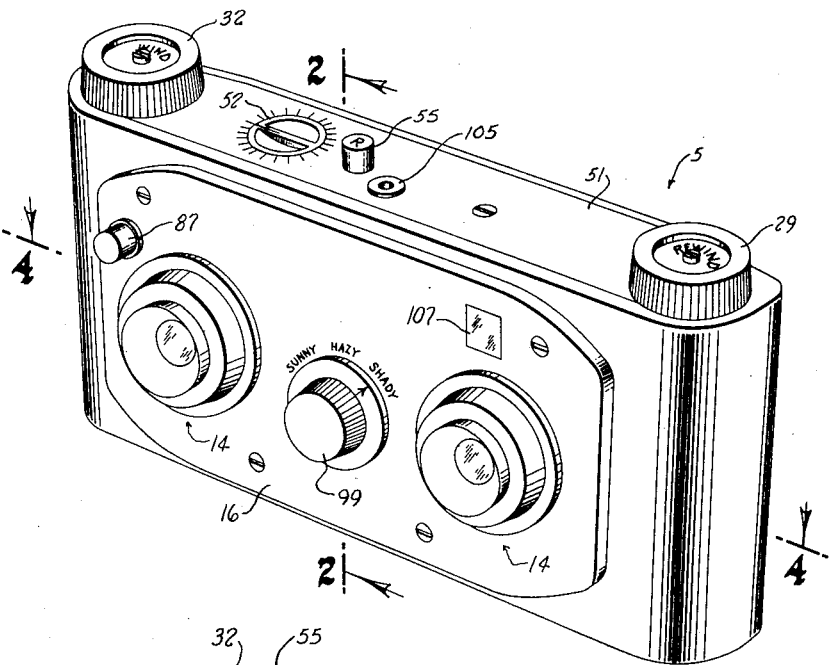
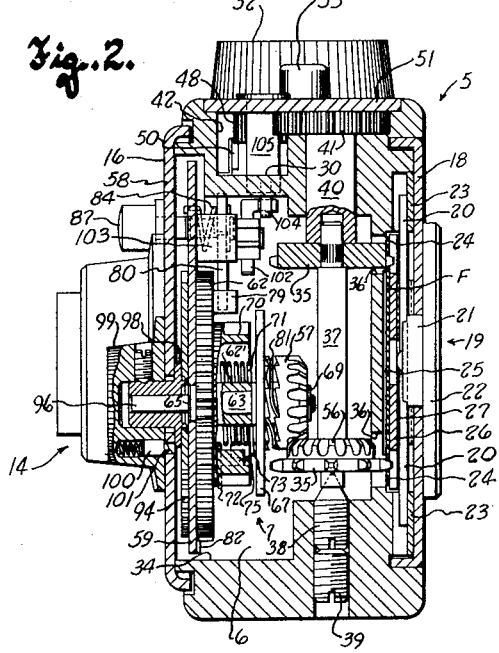

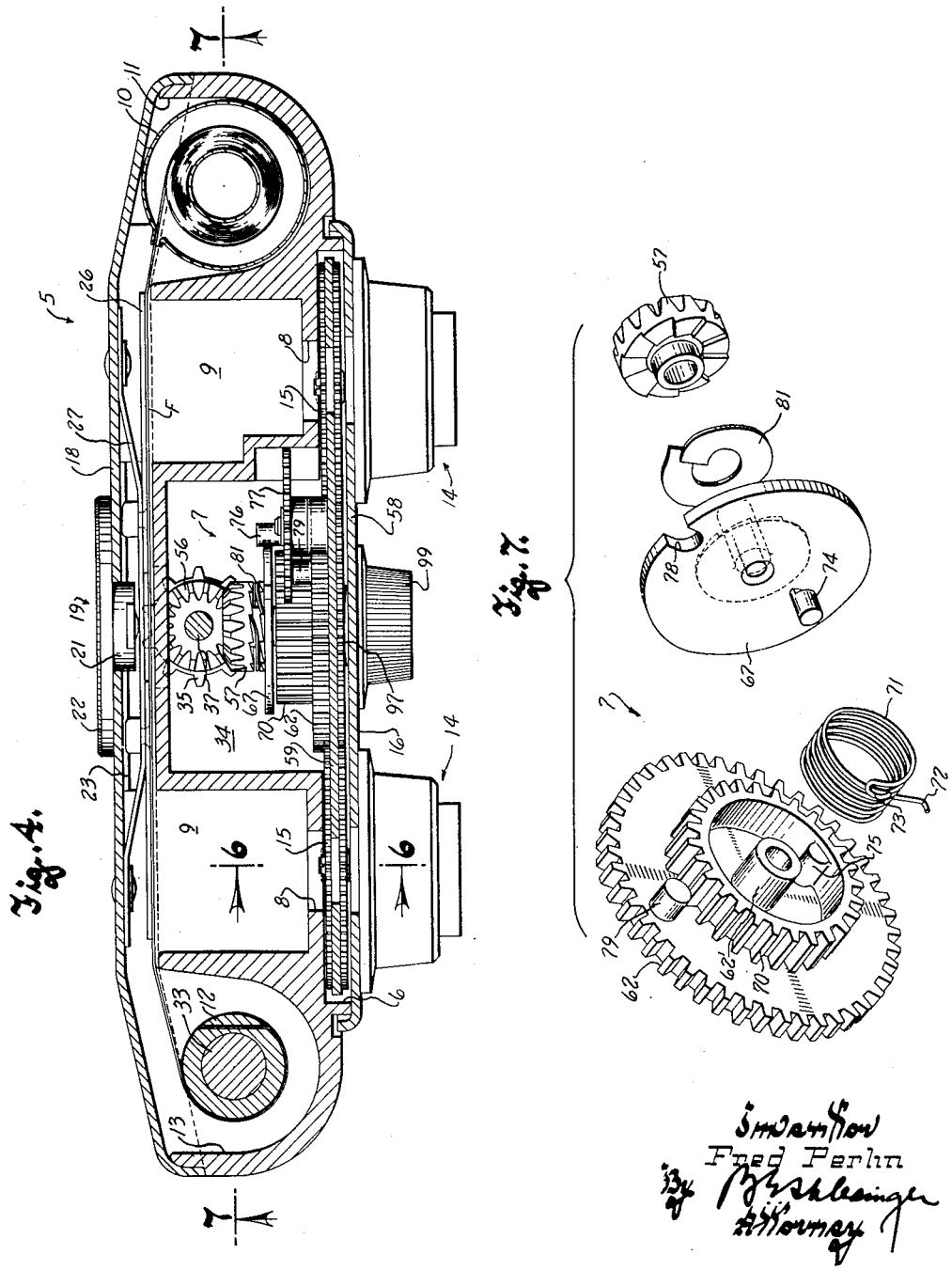

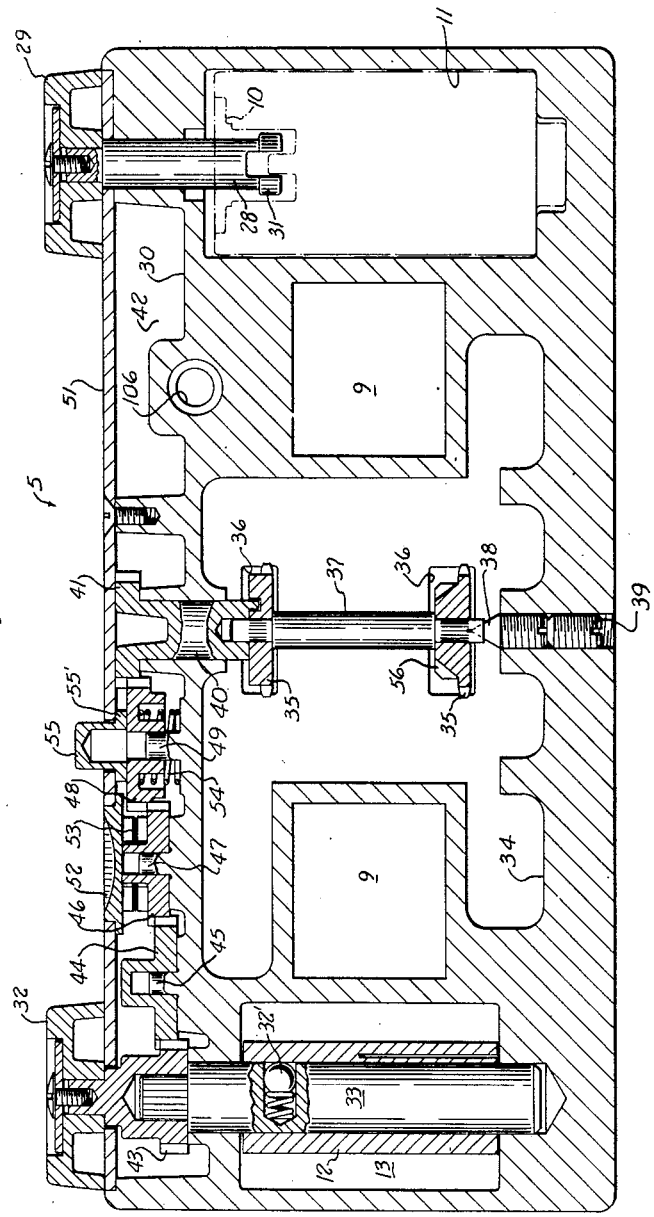
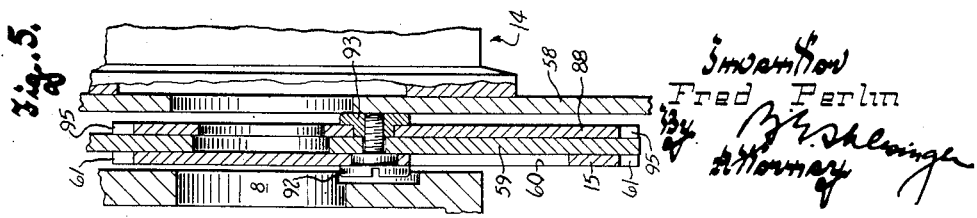

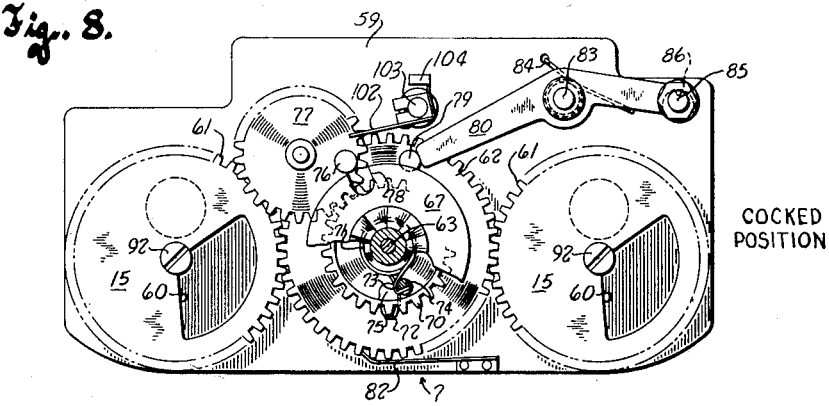
Fig. 8. COCKED POSITION
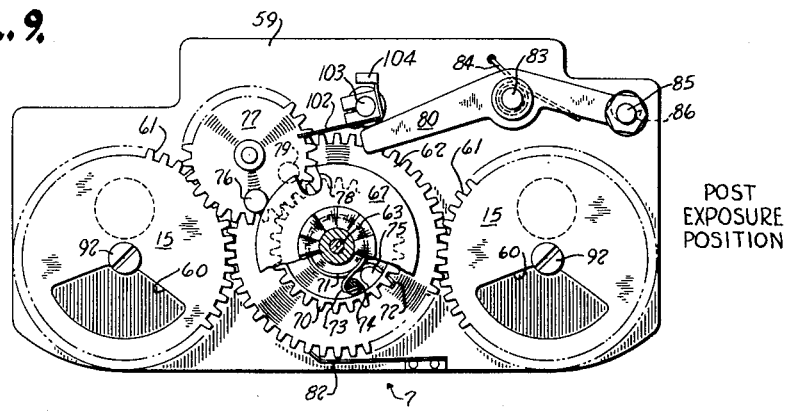
Fig. 9. POST EXPOSURE POSITION
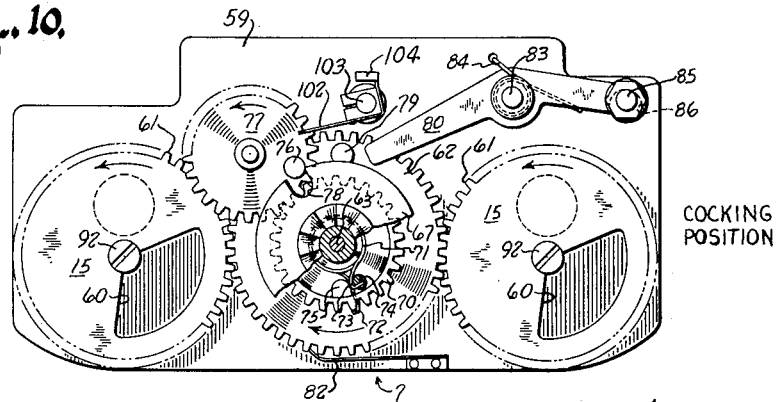
Fig. 10. COCKING POSITION

United States Patent Office 2,807,990
Patented Oct. 1, 1957

2,807,990

FLASH SYNCHRONIZING FOR STEREOCAMERA

Fred Perlin, Oconomowoc, Wis., assignor to Graflex, Inc., Rochester, N. Y., a corporation of Delaware Original application November 1, 1952, Serial No. 318,153. Divided and this application May 13, 1954, Serial No. 429,581

1 Claim. (Cl. 95—11.5)

The present invention relates to cameras and more particularly to a stereocamera. This application is a division of my parent application, Serial No. 318,153, filed November 1, 1952, and it is directed specifically to the flash synchronizing mechanism of my stereocamera.

One object of this invention is to simplify the mechanism of a stereocamera and reduce the number of its parts; and as a corollary, to reduce the cost of the stereocamera without sacrificing good performance.

Another object of this invention is to incorporate in the camera an electric switch for setting off a flash bulb and to provide means for actuating the switch in exact synchronization with film exposing rotation of the shutters.

Other objects of the invention will be apparent hereinafter from the specification and from the recital of the appended claim.

In the drawings:

Fig. 1 is a perspective view of a stereocamera constructed according to one embodiment of the invention;

Fig. 2 is a vertical cross section through Fig. 1 on the plane of the line 2—2 and looking in the direction of the arrows;

Fig. 3 is a section also on the plane of the line 2—2 in Fig. 1, duplicating, but on an enlarged scale, part of the structure shown in Fig. 2;

Fig. 4 is a longitudinal section through Fig. 1 on the plane of the line 4—4 and looking in the direction of the arrows;

Fig. 5 is a detail section through Fig. 4 on the plane of the line 6—6 looking in the direction of the arrows and illustrating the manner in which the shutters and diaphragms are mounted and related to the light entry apertures of the camera;

Fig. 6 is a section through Fig. 4 substantially on the plane of the line 7—7 and looking in the direction of the arrows;

Fig. 7 is an exploded perspective view of the shutter cocking mechanism; and

Figs. 8, 9 and 10 are elevational views of the inner face of the front wall of the camera and the shutter mechanism mounted thereon and illustrating the shutter mechanism parts respectively in cocked, post-exposure, and cocking positions, parts of said views being broken away to better illustrate details.

Referring now to the accompanying drawings in which like numerals indicate like parts throughout the several views, the numeral 5 designates generally the body of a stereocamera constructed according to one embodiment of this invention and which is preferably formed as a die casting. The front face of the body has a cavity 6, Fig. 4, in its middle portion to accommodate the shutter cocking mechanism of the camera indicated generally by the numeral 7 (Fig. 3). At opposite sides of this cavity 6 the body has a pair of light entry apertures 8 leading to rearwardly facing exposure chambers 9.

The film F (Figs. 2 and 4) to be exposed passes across the back face of the body from a cartridge 10 mounted in a rearwardly opening pocket 11 at one end of the body to a spool 12 rotatably mounted in a pocket 13 which also opens to the rear face of the camera but at the opposite end of the body. The film thus closes the back of each of the two exposure chambers 9 to be impinged by light admitted into these chambers.

Light is admitted into the exposure chambers 9 through lenses indicated generally by the numeral 14 (Figs. 1, 2 and 4) under control of a pair of shutters 15 (Figs. 4, 8, 9 and 10). The shutters and lenses, as well as the shutter cocking mechanism 7, are mounted upon a removable front wall 16 detachably held in position across the front face of the camera body. As will appear more fully hereinafter, by mounting the entire front mechanism, which includes the shutters, the shutter cocking mechanism, the diaphragms and the means for adjusting them upon the front wall 16, the entire front mechanism of the camera may be completely tested for all its functions before assembly thereof with the camera body.

The back of the camera is closed by a cover 18 (Fig. 4) which is flanged and shaped to snugly fit the back face of the camera body where it is removably held in place by a rotatable latch 19. This latch consists of a pair of oppositely extending arms 20 (Fig. 2) fixed to the hub 21 of a large diameter knurled knob 22 overlying the center of the cover, the hub 21 passing through and being journaled in a hole in the cover. Upon rotation of the knob the ends of the arms 20 are engageable under a pair of strap-like keepers 23 secured to the body.

The back face of the camera body is U-shaped in cross section to provide a film receiving track leading from the cartridge pocket 11 to the receiving spool pocket 13. At its opposite sides the film track has longitudinally extending, slightly elevated parallel coplanar lands or ledges 24 upon which the perforated marginal edge portions of the film ride with the sensitized portion of the film clear of the intervening track bottom 25 (Fig. 2). A pressure plate 26 resiliently carried by the back cover 18 to which it is secured by a leaf spring 27 (Fig. 4) holds the film firmly on the track portions 24 along the entire length thereof.

In loading the camera with film, the rear cover plate 18 obviously must be removed, and upon such removal a fresh film cartridge 10 is readily placed in position in its pocket 11 and the free end of the film drawn from the cartridge and attached to the spool 12. As is customary the placement of a film cartridge 10 in its pocket 11 entails endwise withdrawal of a rewind stem 28 (Fig. 6), the outer end of which has a rewind knob 29 fixed thereon. The stem 28 is freely rotatably and slidably mounted in a bearing formed directly in the top wall 30 of the camera body, and axial outward withdrawal thereof is limited by a collar 31 on its inner bifurcated end. After the cartridge is in position the stem 28 is, of course, pushed back in and drivingly engaged with the spool of the cartridge to enable rewinding the film after the same has been fully exposed.

The spool 12, upon which the film is wound with each indexing thereof from one exposure position to the next, is rotated by turning a knob 32. This knob is joined to a shaft 33 journalled in bearings in the top and bottom body walls 30 and 34, respectively, and upon which the spool is frictionally secured. Any suitable friction means may be employed for this purpose but in the present instance a small spring pressed ball 32' seated in a radial socket in the shaft bears against the bore of the spool.

It is, of course, essential that the film be advanced exactly the same distance with each indexing thereof. Hence, the film advancing torque applied to the knob 32 is transmitted to the film by a pair of sprocket wheels 35 projecting through access holes 36 in the track portions 24 and meshing with the perforations in the marginal edges of the film (Figs. 2 and 4). During the indexing of the film these sprocket wheels are turned a definite amount determined by timing means in the shutter cocking mechanism 7 which, as will be later explained, makes it impossible to trip the shutters until the film has been fully indexed.

The sprockets 35 are fixed upon a shaft 37 (Figs. 2 and 6) freely rotatably supported from the top and bottom body walls 30 and 34, respectively. The mounting for the bottom end of the shaft 37 comprises a pointed center 38 threaded in the bottom wall 34 and locked in place by a set screw 39. The top end of the shaft 37 is rotatably supported by being drivingly attached to the hub 40 of a gear 41 journaled in the top body wall 30.

The top wall 30 of the camera body is formed with an upwardly facing cavity 42 (Fig. 6) and located in this cavity is a train of gears connecting the sprocket gear 41 with a main drive pinion 43. The drive pinion is fixed to the spool shaft 33 and in fact constitutes the connection between the shaft and the indexing knob 32. The train of gears consists of an idler gear 44 meshing with the pinion 43 and freely rotatably journaled upon a trunnion 45; a counter gear 46 meshing with the idler gear 44 and journaled upon a trunnion 47; and a release gear 48 meshing with the counter gear 46 and the sprocket drive gear 41 and journaled upon a trunnion 49.

The idler gear 44, in addition to forming part of the described gear train, also coacts with a spring pawl 50 (Fig. 2) to restrain the indexing knob 32 against retrograde rotation. Attention is directed to the fact that the mounting of the spring pawl 50 does not interfere with axial placement of the gear 44 upon its trunnion 45 or removal therefrom.

All of the gears of the gear train, including the drive pinion 43 and the shaft 33 to which it is fixed, are held in place by a cover 51 removably secured across the open top of the cavity 42 (Figs. 1, 2 and 6); and to enable removal of the cover 51 for access to the gears both of the knobs 32 and 29 are removable from their respective shafts.

The counter gear 46 has a unidirectional torque transmitting connection with a dial 52 (Fig. 1) journaled in the cover plate and exposed on the exterior thereof. An arrow on the dial coacts with graduations on the surrounding portion of the cover, delineated in film footage or numbers of exposure to indicate the amount of unexposed film remaining in the camera. The unidirectional driving connection between the counter gear and its dial is preferably provided by a conventional wafer-type pawl 53 (Fig. 6) confined between and coacting with ratchet teeth on the adjacent faces of the gear and dial.

After the entire roll of film has been exposed it must be rewound onto the cartridge spool which, of course, entails retrograde rotation of the sprocket wheels. To allow such retrograde rotation of the sprocket wheels is one of the functions of the release gear 48. To this end the gear 48 is slidable axially upon its trunnion 49 to and from meshing engagement with the sprocket drive gear 46 and is yieldingly held in its position meshing with the gear 41 by a compression spring 54. The thrust of the spring is carried by the cover plate 51 to which it is transmitted by a release button 55 slidably mounted in a hole in the cover plate and provided with a flange 55' (Fig. 6) interposed between the top of the gear and the underside of the cover plate. As will be evident, depression of the release button 55 frees the sprocket wheels 35 for retrograde rotation so that the film may be rewound upon the cartridge spool by turning the rewind knob 29.

The sprocket wheel shaft 37 has a bevel gear 56 (Figs. 2, 4, 6) fixed thereon to mesh with a bevel gear 57 (Figs. 2 and 3) on the shutter cocking mechanism 7. Preferably, though not necessarily, the bevel gear 56 and the lower sprocket wheel 35 are directly connected to one another.

The shutter cocking mechanism, as hereinbefore indicated, is carried by the removable front wall 16 (Figs. 2 and 4) of the camera so that the driving connection between the film indexing mechanism and the shutter cocking mechanism and which is provided by the meshing bevel gears, is automatically established with the attachment of the front wall 16 to the camera body.

The front wall 16 comprises a cover plate 58 and a mechanism mounting plate 59 secured to one another in parallel spaced relation. The space between these plates accommodates the diaphragm discs. The lenses 14 are, of course, mounted upon the cover plate. Both of the plates have light entry apertures to align with the apertures 8 in the front wall of the camera body.

The shutters 15 closely overlie the rear face of the mechanism mounting plate 59 (Fig. 4) and are mounted thereon to rotate in one direction about fixed axes so positioned with respect to the light entry apertures that as they rotate their "windows" 60 (Figs. 8, 9 and 10) are momentarily aligned with the apertures to admit film exposing light. Each shutter has a gear 61 fixed with respect thereto and preferably formed by teeth cut directly into the periphery of the disc which provides the shutter. The two shutter gears are positively drivingly connected by an intermediate shutter drive gear 62 (Figs. 2 and 7 to 10 inclusive) also overlying the rear face of the mechanism mounting plate 59 and mounted thereon for rotation about a fixed axis.

The mounting for the shutter drive gear comprises a multidiameter post or shaft 63 (Figs. 2, 3, 8, 9 and 10) passing through and rigidly fixed to the mechanism mounting plate by having the edge portion of the hole in the plate through which it passes clamped between a flange 64 on the post or shaft and a swedged portion 65. The portion 66 of the rearward projection of the post or shaft has the hub 62' (Figs. 3 and 7) of the shutter drive gear freely rotatably journaled thereon and held in place by being confined between the flange 64 and a timing disc 67 freely rotatably journaled upon the reduced rear end portion 68 of the post or shaft; the timing disc being held against axial displacement from the post or shaft 63 by means of a C-washer 69 fixed to the rearmost end of the post or shaft.

The shutter drive gear 62 has a ring gear 70 (Fig. 7) formed integrally therewith and projecting from its rear face to surround the hub 62'. The annular space thus provided between the ring gear 70 and the hub 62' accommodates a coiled torsion spring 71. One end 72 of this spring is anchored to the shutter drive gear 62 and its other end 73 is anchored to the timing disc 67 by being hooked onto an abutment in the form of a pin 74 projecting from the front face of the disc. The abutment 74 is received in the annular space between the ring gear 70 and the hub 62' and is positioned to collide with an abutment 75 projecting radially inwardly from the ring gear 70. Such engagement between the two abutments occurs when the shutter cocking mechanism has been brought into its fully cocked condition, shown in Fig. 8, as will be hereinafter more fully described.

Since one end of the spring 71 is anchored to the shutter drive gear 62 and its other end is attached to the timing disc 67, it follows that upon relative rotation of these parts in the proper direction the spring 71 may be wound up or tensioned. To effect such relative rotation between the shutter drive gear 62 and the timing disc 67, means are provided to hold the gear against rotation while the disc is turned as a consequence to indexing of the film. This holding function is performed by what may be referred to as a post-exposure stop and which comprises an abutment or pin 76 (Figs. 8, 9 and 10) and the edge of the timing disc 67. The abutment or pin 76 is carried by a timing gear 77 freely rotatably mounted upon the mechanism mounting base and meshing with the ring gear 70 and travels in a circular orbit which crosses the edge of the timing disc 67. Hence, as the pin 76 is carried along by the timing gear it collides with the edge of the disc and thereby restrains the timing gear and hence the shutter drive gear and the shutters against turning while permitting the timing disc to turn. With the engagement of the pin 76 with the edge of the timing disc the shutters are in their post-exposure positions to which they have been rotated by the shutter spring during the previous film exposure.

This post-exposure position of the parts is maintained until the timing disc 67 is rotated, by the film indexing mechanism, far enough to align a gate or notch 78 (Figs. 7, 8, 9 and 10) in its edge with the pin 76. With the entry of the pin 76 into the gate or notch 78 the timing gear is again free to turn under the influence of the spring, but it should be noted that at this time the rotation of the timing gear 77 and with it the rotation of the shutters is under the control of the timing disc. This control is maintained until the very instant the disc has turned far enough to allow the pin 76 to leave its gate or notch 78; and as will appear from a comparison of Figs. 8 and 10, this position of the parts is not reached until the indexing of the film is complete.

The termination of the film advance by the actuation of the indexing mechanism is defined by the engagement of an abutment 79 (Fig. 7) on the gear 62 with a trigger stop 80 (Figs. 8, 9 and 10) and the collision of the pin 74 on the timing disc with the abutment 75 on the then stationary ring gear 70. Since the pin 76 does not leave the gate or notch 78 until the instant the abutment 79 comes up against the trigger stop 80 to thereby not only stop the film advance but also define the cocked position of the shutters, an important corollary of the action just described is that the shutters cannot be released from their cocked positions until the film has been fully indexed.

The bevel gear 57 (Figs. 2, 3, 4 and 7) through which the drive from the film indexing mechanism is carried into the shutter cocking mechanism is mounted upon the hub of the timing disc 67, and is drivingly connected with the timing disc through a unidirectional clutch which in the present instance comprises a wafer-type pawl 81 (Figs. 2, 3, 7) coacting with ratchet teeth on the adjacent faces of the gear and disc. The unidirectional aspect of this connection between the gear and the timing disc permits rewinding of the film without interference from the shutter cocking mechanism since it allows retrograde rotation of the bevel gears along with the sprocket wheels while the timing disc remains stationary.

Though the pawl 81 is intended to yield during retrograde rotation of the bevel gears and thus allow the timing disc to remain stationary during rewinding of the film, to assure this result a light leaf spring type pawl 82 (Figs. 2, 8, 9 and 10) is provided. This pawl 82 is mounted on the base 59 and has its free end engaging the teeth of the shutter drive gear 62 to hold the gear against retrograde rotation without, however, resisting its forward, spring-produced rotation during movement of the shutters from their cocked positions.

The trigger stop 80 (Figs. 8, 9 and 10) is formed by one end of a lever medially pivoted upon the mechanism mounting base as at 83 and is yieldingly held in its operative position by a torsion spring 84. The operative position of the stop is defined by the engagement of a stud 85 carried by the lever with the top of a hole 86 in the mechanism base, the hole being large enough to allow the lever to be rocked to and from its operative position. To enable the lever to be moved to release the shutters, the stud has an actuating knob 87 (Fig. 1) mounted thereon and accessible at the front of the camera.

The discs 88 (Fig. 5), previously mentioned, are mounted behind each shutter by the same means which mounts the shutters. The common support for each shutter and the associated diaphragm may be constructed in any suitable manner. It may be a simple rivet, but in the structure shown it comprises a screw 92 (Fig. 5) stepped to provide a journal for the shutter disc and a headed stud 93 into which the screw is threaded and which, like the screw, is stepped to provide a journal for the diaphragm disc, it being understood that the mechanism mounting plate is clamped between the journal providing portions of the screw and stud.

The two diaphragm discs are geared together by means of a diaphragm adjusting gear 94 (Fig. 3) which meshes with gear teeth 95 (Fig. 5) on the peripheries of the diaphragm discs. The diaphragm adjusting gear 94 is rotatably mounted upon the forward projection 96 of the post or shaft 63 (Figs. 2 and 3) upon which the shutter drive gear, the timing disc and the bevel gear 57 are journaled. Thus the mounting for the diaphragm adjusting gear comprises a hub 97 to which the gear is fastened and which has a flange 98 overlying the inner face of the cover 58. The protruding end of the hub 97 has a diaphragm adjusting knob 99 (Fig. 1) fastened thereto and in the underside of this knob is a detent pin 100 (Fig. 3) which coacts with detent holes 101 in the cover to indicate the different positions of the diaphragm discs at which their holes are selectively aligned with the light entry apertures.

The stop abutment 76 (Figs. 8, 9 and 10) on the timing gear 77 in addition to forming part of the post-exposure stop (by virtue of its engagement with the edge of the timing disc 67) also provides a positively synchronized flash switch actuator. To this end a spring contact finger 102 is mounted on but insulated from a post 103 projecting from the back of the mechanism mounting base 59 with the free end of the contact finger lying in the path of the pin 76 (Figs. 8, 9 and 10). The contact finger 102 is connected in one side of a flash bulb circuit, the other side of which is grounded. Hence, as the pin, which of course is also grounded, travels along its orbit upon release of the shutters and transiently engages the contact finger, the flash bulb circuit is momentarily closed. The placement of the contact finger 102 is such that this completion of the flash bulb circuit is correctly timed and, of course, exactly synchronized with the film exposing rotation of the shutters.

To connect the ungrounded contact finger 102 into the flash bulb circuit it is electrically connected as at 104 with a plug socket 105 (Figs. 1 and 2) mounted on the top of the camera and adapted to receive the plug on the end of the connecting wire of a flash bulb attachment, not shown. This connection 104 between the contact finger and the plug socket must not interfere with the attachment of the front mechanism as a complete subassembly. Hence, it is formed in the manner of a plug-in jack as best shown in Fig. 2.

While the view finder of the camera is a detail which can be incorporated in any desired manner, in the present invention it consists simply of a cored opening 106 (Fig. 6) through the die cast body of the camera in line with a suitable lens 107 (Fig. 1) in the front camera wall, and with a similar lens (not shown) in the back camera wall.

Assuming that the camera is loaded with film and in all respects is ready for use, the appropriate diaphragm openings are brought into alignment with the light entry apertures by rotation of the knob 99 (Fig. 1) which carries an arrow to coact with the designations "sunny," "hazy" and "shady." The film is then advanced by rotation of the film indexing knob 32 to bring it to its first exposure position. During this film indexing action torque is positively transmitted to the sprocket shaft 37 from the knob 32 through the gear train comprising the meshing gears 43, 44, 46, 48 and 41. The consequent rotation of the sprocket draws the film from its cartridge 10 and advances the same a predetermined distance. At the same time the positive rotation of the sprocket shaft 37 transmits torque to the shutter cocking mechanism through the meshing bevel gears 56 and 57 and the unidirectional clutch 81 between the bevel gear 57 and the timing disc 67.

Since the shutter spring 71 is at all times under some degree of tension, the stop pin 76 is in engagement with the edge of the timing disc 67, defining the post-exposure position of the shutters (Fig. 9), as rotation of the bevel gear 57 begins to turn the disc.

The engagement of the stop pin 76 with the edge of the timing disc 67 not only holds the shutters against turning from their post-exposure positions but also restrains the timing gear 77 and the ring gear 70 against turning so that as the bevel gear 57 and the timing disc continue to turn the resulting relative rotation between the timing disc and the ring gear 70 winds up and increases the tension upon the spring 71. As this relative rotation between the timing disc 67 and the gear progresses and the tension on the spring increases the gate or notch 78 in the edge of the timing disc moves into alignment with the stop pin 76 whereupon the pin enters the gate and the gears begin to revolve under control of the timing disc. By this time the spring 71 is almost fully tensioned.

After a few more degrees of rotation during which the tensioning of the spring is completed, the pin 76 moves out of the gate or notch 78 to thus free the shutters from restraint by the timing disc. However, at this instant the abutment 79 on the shutter drive gear 62 comes up against the trigger stop 80 and the abutments 74 and 75 engage. The first of these two engagements defines the cocked positions of the shutters and holds the shutter mechanism in its cocked condition. The second stops the film advancing actuation of the indexing mechanism.

When the shutter release button 87 is pressed, the trigger 80 is removed from the path of the abutment 79, freeing the shutters for spring produced rotation. Gear 62 is rotated clockwise and the timing gear 77, with its stop pin 76, is rotated counterclockwise (Fig. 10). The free end of the spring contact finger 102 is in the path of the pin 76. Therefore, when gear 62 has driven gears 61 far enough to open the shutters, timing gear 77 will have carried pin 76 far enough to trip the finger 102 closing the flash bulb circuit. By the structure, herein disclosed, exact synchronization of the flash and exposure of the film is assured.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claim.

Having thus described my invention what I claim is:

In a stereocamera having a pair of laterally-spaced light-entry apertures, a pair of shutters rotatable, respectively, on separate, spaced, parallel axes, each adapted to control the entry of light into the camera through one of said apertures, a rotary drive gear mounted to rotate about a fixed axis parallel to the shutter axes and offset from both, said drive gear being geared to both shutters to rotate the same, a first abutment carried by one of the three named rotatable parts, a shutter spring acting upon said drive gear and operable to effect rotation of said gear and thereby simultaneous rotation of said shutters, a member rotatable relative to said gear for tensioning said spring to cock said gear, a trigger releasably engageable with said first abutment to hold the gear in its cocked position, a timing member geared to said drive gear to rotate therewith when said trigger is released, a second abutment carried by said timing member and positioned to engage the first-named member to restrain said drive gear against rotation during rotation of the first-named member, thereby to enable tensioning of said spring, an electric switch for setting off a flash bulb, and means for closing said switch, said last-named means lying in the path of said second abutment to be transiently engaged thereby and by such engagement to effect closure of said switch.

References Cited in the file of this patent

UNITED STATES PATENTS

| | | |
|---|---|---|
| 694,364 | Frachebourg | Mar. 4, 1902 |
| 2,263,045 | Mendelsohn | Nov. 18, 1941 |
| 2,277,233 | Kende et al. | Mar. 24, 1942 |
| 2,384,639 | Riddell | Sept. 11, 1945 |

FOREIGN PATENTS

| | | |
|---|---|---|
| 330,693 | France | Mar. 28, 1903 |